UNITED STATES PATENT OFFICE.

WILLIAM T. KENDRICK, OF MONTGOMERY, ALABAMA, AND WILLIAM T. KENDRICK ADMINISTRATOR OF GEORGE W. DIXON, DECEASED.

PROCESS OF MAKING DISINFECTANTS.

SPECIFICATION forming part of Letters Patent No. 701,352, dated June 3, 1902.

Application filed March 19, 1902. Serial No. 99,032. (No specimens.)

*To all whom it may concern:*

Be it known that we, WILLIAM THOMAS KENDRICK, a citizen of the United States of America, and a resident of the city of Montgomery, in the county of Montgomery, and GEORGE W. DIXON, deceased, late a citizen of the United States of America, and a resident of Auburn, in the county of Lee, State of Alabama, have invented a new and useful Process of Making a Disinfectant, of which the following is a specification.

The objects of our invention are the prevention and cure of diseases, the cleansing and healing of wounds in man, beast, and fowl, and for general antiseptic, disinfectant, and germicidal purposes.

Referring to the formula which forms a part of this specification, the remedy is manufactured from the following drugs and in the following manner: chlorid of lime, carbonate of soda, boracic acid, permanganate of potassa, and water. Add slowly, stirring briskly, twelve gallons of water to ten pounds of chlorid of lime. Let this stand twelve hours and then draw off the clear fluid. Dissolve sixteen pounds of carbonate of soda in three gallons of water by heat. When thoroughly dissolved, add to the solution of chlorid of lime and mix well. Allow this mixture to stand until precipitation ceases. When the mixture is thoroughly settled, draw off the supernatant clear fluid and add one-half ($\frac{1}{2}$) grain of permanganate of potassa and five grains of boracic acid to the ounce of this fluid. Allow this to settle well and then bottle for use. This makes a borochloro-manganate of lime, soda, and potassa and is an effective antiseptic, disinfectant, and germicide for external, internal, and universal use in the household, the hospital, and the stock-yard.

What we claim is—

The process of compounding a liquid chemical composition for the purpose stated, comprising essentially chlorid of lime, carbonate of soda, boracic acid, permanganate of potassa, in substantially the proportions specified, consisting in incorporating chlorid of lime and water, then permitting precipitation and decanting the supernatant fluid; then dissolving carbonate of soda in water by means of heat, then mixing the solutions of chlorid of lime and carbonate of soda and permitting the combined solutions to stand until precipitation is complete; then removing the supernatant solution; and then incorporating boracic acid and permanganate of potassa and permitting substantially complete precipitation, and then removing the supernatant fluid from the residuum, substantially as set forth.

In testimony whereof we have hereunto set our hands in presence of two subscribing witnesses.

WM. T. KENDRICK.
    WM. T. KENDRICK,
*Administrator of the estate of Geo. W. Dixon, deceased.*

Witnesses:
 J. J. MCPHERSON,
 W. A. TYNER.